(12) United States Patent
Hughes et al.

(10) Patent No.: US 6,862,267 B1
(45) Date of Patent: Mar. 1, 2005

(54) DETERMINING NETWORK ADDRESSES AND PORTS USING TABLE FROM A DESCRIPTION FILE

(75) Inventors: Earnest E. Hughes, San Antonio, TX (US); Herbert V. Savage, III, San Antonio, TX (US)

(73) Assignee: Nortel Networks Limited, St. Laurent (CA)

( * ) Notice: Subject to any disclaimer, the term of this patent is extended or adjusted under 35 U.S.C. 154(b) by 784 days.

(21) Appl. No.: 09/728,418

(22) Filed: Nov. 28, 2000

Related U.S. Application Data (60) Provisional application No. 60/203,138, filed on May 8, 2000.

(51) Int. Cl.[7] .................................................. H04J 1/16
(52) U.S. Cl. ........................ 370/252; 370/389; 709/245
(58) Field of Search ................................ 370/252, 389, 370/474, 351, 392, 395.3, 395.31, 401, 468–467; 709/245, 223, 225, 238, 249

(56) References Cited

U.S. PATENT DOCUMENTS

| | | | | |
|---|---|---|---|---|
| 6,128,298 A | * | 10/2000 | Wootton et al. | ............ 370/392 |
| 6,175,867 B1 | * | 1/2001 | Taghadoss | ................... 709/223 |
| 6,483,804 B1 | * | 11/2002 | Muller et al. | ................ 370/230 |
| 6,535,511 B1 | * | 3/2003 | Rao | ............................ 370/392 |
| 6,581,108 B1 | * | 6/2003 | Denison et al. | ............. 709/245 |
| 6,598,034 B1 | * | 7/2003 | Kloth | ........................... 706/47 |

OTHER PUBLICATIONS

The Internet Engineering Task Force (IETF) Network Working Group Request for Comments (RFC) 1631, The IP Network Address Translator, May 1994.*

* cited by examiner

*Primary Examiner*—John Pezzlo
(74) *Attorney, Agent, or Firm*—Blakely Sokoloff Taylor & Zafman LLP (57) ABSTRACT

In one embodiment of the invention, a NAT processor includes a table and a parser. The table stores a plurality of entries for a packet in a sequence of packets of a message transmitted from the first network to the second network. The entries include a first connection identifier corresponding to the first network. The entries are obtained from a description file of the packet. The parser is coupled to the table to parse the sequence of packets using the table. The parser extracts the first connection identifier.

32 Claims, 6 Drawing Sheets

```
MULTIMEDIA SYSTEM CONTROL DEFINITIONS AUTOMATIC TAGS ::=
BEGIN
MultimediaSystemControlMessage      ::=CHOICE
{   request     RequestMessage,
    response    ResponseMessage,
    ...
}
RequestMessage          ::=CHOICE
{   nonStandard             NonStandardMessage,
    openLogicalChannel      OpenLogicalChannel,
    ...,
    conferenceRequest       ConferenceRequest
}
OpenLogicalChannel      ::=SEQUENCE
{   portNumber   INTEGER (0..65535)   OPTIONAL,
    multiplexParam   CHOICE
        {   h222LogicalChannelParam    H222LogicalChannelParam,
            h223LogicalChannelParam    H223LogicalChannelParam,
            ...,
            h2250LogicalChannelParam   H2250LogicalChannelParam,
        }
}
H2250LogicalChannelParam    ::=SEQUENCE
{   nonStandard SEQUENCE OF NonStandardParam OPTIONAL,
    mediaChannel                TransportAddress OPTIONAL,,
    ...,
    source                      TerminalLabel OPTIONAL
}
TransportAddress    ::=CHOICE
{   unicastAddress      UnicastAddress,
    multicastAddress    MulticastAddress,
    ...
}
UnicastAddress      ::=CHOICE
{   ipAddress SEQUENCE
        {   ipAdr           IPAddress,
        --  network         OCTET STRING (SIZE(4)),
        --  tsapIdentifier  INTEGER(0..65535),
            ...
        },
    ...,
    nonStandardAddress  NonStandardParam
}
END
```

```
STATIC SHORT
MULTIMEDIASYSTEMCONTROLMESSAGE[135] = {
                 0      ~ 510
/*   1*/    ext + choice, 4, 0, 8, 0, 0, 0,
/*   8*/    ext + choice, 11, 2, 0, 0, 0, 75, 0, 0, 0, 0, 0, 0, 0, 0, 0,
/*  24*/    cons, 0,
/*  26*/    cons, 1,
/*  27*/    cons, 1, /* 119*/    ipAdr,
/* 120*/    ext + sequence, 1, 0, 0, 119,    ~ 520
/* 125*/    ext + choice, 5, 2, 120, 0, 0, 0, 0, 0, 0,
            }
```

DETERMINING NETWORK ADDRESSES AND PORTS USING TABLE FROM A DESCRIPTION FILE

RELATED APPLICATION

This application claims the benefit of U.S. Provisional Application No. 60/203,138, titled "A System and Method for Determining Network Addresses and Ports" filed on May 8, 2000.

BACKGROUND

1. Field of the Invention

This invention relates to information processing. In particular, the invention relates to network address translation.

2. Description of Related Art

The need for a Network Address translation arises when a network's internal addresses cannot be used outside the network either for privacy reasons or because they are invalid for use outside the network. Basic Address translation would allow hosts in a private network to transparently access the external, or public, network and enable access to selective local hosts from the outside. Organizations with a network setup predominantly for internal use, with a need for occasional external access are good candidates for this scheme. Many Small Office, Home Office (SOHO) users and telecommuting employees have multiple Network nodes in their office, running applications, but have a single Internet Protocol (IP) address assigned to their remote access router by their service provider to access remote networks.

Messages are typically transmitted over the network domain in packets. Packets contain information other than the actual data in the messages. To describe the information and the data in an organized manner, it is useful to have a formal method of abstraction of the packet contents. One such method is the Abstract Syntax Notation One (ASN.1).

ASN.1 is a formal notation used for describing data transmitted by telecommunications protocols, regardless of language implementation and physical representation of these data, whatever the application, whether complex or very simple.

One of the main reasons for the success of ASN.1 is that this notation is associated with several standardized encoding rules such as the Basic Encoding Rules (BER), or more recently the Packed Encoding Rules (PER), which prove useful for applications that undergo restrictions in terms of bandwidth. These encoding rules describe how the values defined in ASN.1 can be translated into the bytes 'over the wire' and reverse.

Existing techniques to perform address translation include exhaustively traversing all possible contents for a given data packet to locate addresses and ports. This approach is time consuming and wastes processing resources.

Therefore, there is a need in the technology to provide a technique for network address translation.

SUMMARY

A method and apparatus provides network address translation (NAT) between a first network and a second network. A NAT processor includes a table and a parser. The table stores a plurality of entries for a packet in a sequence of packets of a message transmitted from the first network to the second network. The entries include a first connection identifier corresponding to the first network. The entries are obtained from a description file of the packet. The parser is coupled to the table to parse the sequence of packets using the table. The parser extracts the first connection identifier.

According to one embodiment of the present invention, the NAT processor further includes a translator coupled to the parser to translate the first connection identifier into a second connection identifier corresponding to the second network. The table includes at least a message type entry to specify a message type characterizing the message, and at least a data type entry to specify a data type of a subsequent packet in the sequence of packets.

The NAT processor may be able to provide at least one of the following: (1) efficient processing of packets, (2) compact representation of packet information, and (3) easy applicability to any standard, format, or protocol.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DESCRIPTION

A method and apparatus provides network address translation (NAT) between a source network and a destination network. The NAT converts a source connection identifier to a destination connection identifier, or vice versa. A connection identifier may be a network address (e.g., IP address), or a port number. A NAT processor includes a table and a parser. The table stores a plurality of entries for a packet in a sequence of packets of a message transmitted from the source network to the destination network. The entries include a first connection identifier corresponding to the source network. The entries are obtained from a description file of the packet. The parser is coupled to the table to parse the sequence of packets using the table. The parser extracts the first connection identifier.

According to one embodiment of the present invention, the NAT processor further includes a translator coupled to the parser to translate the source connection identifier into a destination connection identifier corresponding to the destination network. The table includes at least a message type entry to specify a message type characterizing the message, and at least a data type entry to specify a data type of a subsequent packet in the sequence of packets.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the method is implemented in a station as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software mining from the machine readable medium may interface with circuitry to perform the described tasks.

Figure 1:
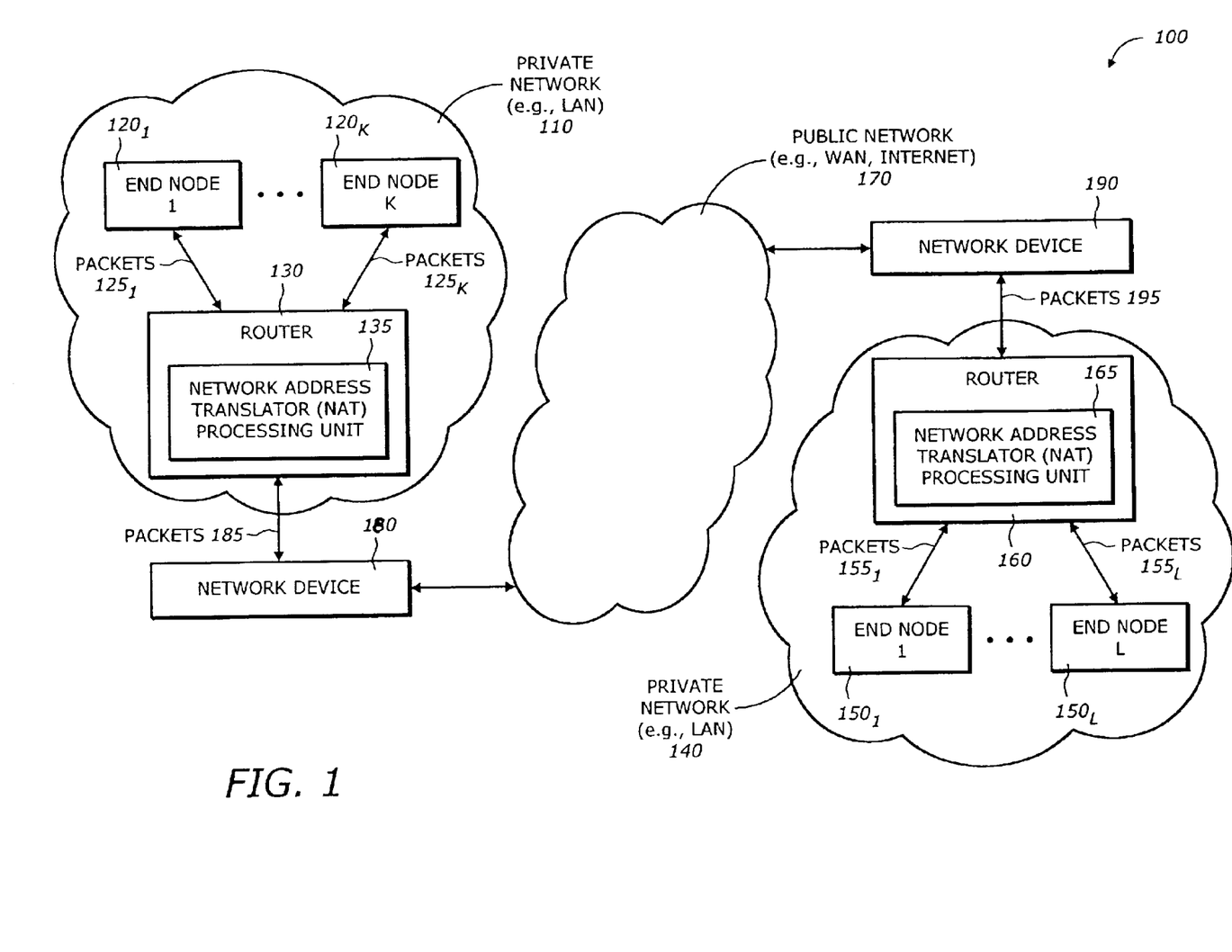
FIG. 1 is a diagram illustrating a system in which one embodiment of the invention can be practiced.

FIG. 1 is a diagram illustrating a system 100 in which one embodiment of the invention can be practiced. The system 100 includes private networks 110 and 140, a public network 170, and network devices 180 and 190.

The private network 110 is a network used within a private entity, such as an organization or an individual home. Examples of the private network 110 include a local area network (LAN) and an intranet. The private-network 110 is connected to the public network 170 via the network device 180. The network device 180 may be a network interface, a server, or a gateway. The private network 110 includes K end nodes $120_1$ to $120_K$, and a router 130. Each of the end nodes $120_1$ to $120_K$ is a device or unit capable of transmitting and/or receiving messages or a sequence of packets $125_1$ to $125_K$ to and/or from the public network 170. Each of the end nodes $120_1$ to $120_K$ may be a computer, a microprocessor, a processing subsystem, a mobile or wireless device, a workstation, a personal digital assistant (PDA) device, etc. The router 130 routes the messages or a sequence of packets 185 between the public network 170 and any one of the end nodes $120_1$ to $120_K$. The router 130 performs routing function based on quality of service (QoS), traffic condition, network handling capability, and other performance criteria. The router 130 includes a network address translation (NAT) processing unit 135. The NAT processing unit 135 receives a sequence of packets of a message either from one of the end nodes $120_1$ to $120_K$ or from the public network 170 and translates the source network addresses and/or port numbers into a destination network addresses and/or port numbers.

Similarly, the private network 140 may be a LAN or an intranet. The private network 140 is connected to the public network via the network device 190. The network device 190 may be a network interface, a server, or a gateway. The private network 140 includes L end nodes $150_1$ to $150_L$, and a router 160. Each of the end nodes $150_1$ to $150_L$ is a device or unit capable of transmitting and/or receiving messages or a sequence of packets $155_1$ to $155_L$ to and/or from the public network 170. Each of the end nodes $150_1$ to $150_L$ may be a computer, a microprocessor, a processing subsystem, a mobile or wireless device, a workstation, a personal digital assistant (PDA) device, etc. The router 160 routes the messages or a sequence of packets 195 between the public network 170 and any one of the end nodes $150_1$ to $150_L$. The router 160 performs routing function based on quality of service (QoS), traffic condition, network handling capability, and other performance criteria. The router 160 includes a network address translation (NAT) processing unit 165. The NAT processing unit 165 receives a sequence of packets of a message either from one of the end nodes $150_1$ to $150_L$ or from the public network 170 and translates the source connection identifier (e.g., network addresses and/or port numbers) into a destination connection identifier (e.g., network addresses and/or port numbers).

The public network 170 is a global network that allows messages to be transmitted and received between the private networks 110 and 140. Other networks may also be connected to the public network 170. For illustrative purposes, only two networks 110 and 140 are shown. Examples of the public network 170 include a wide area network (WAN) and the Internet.

A message may consist of many packets, each packet may include information other than the data contents of the message. This information may include message type, packet/message size, IP address information, and port identifier. The format of certain data packets may be complicated. A description file is typically generated to describe the packets. An example of such complicated data packets include those packets having different protocols in the audio-video standard employed for video conferencing using, say, NetMeeting®. This ASN.1 format description describes the possible contents of a data packet including alternative fields, variable length fields, variable length, optional fields and nested fields. Moreover, this format description includes how such contents are encoded in the data packet.

Figure 2:
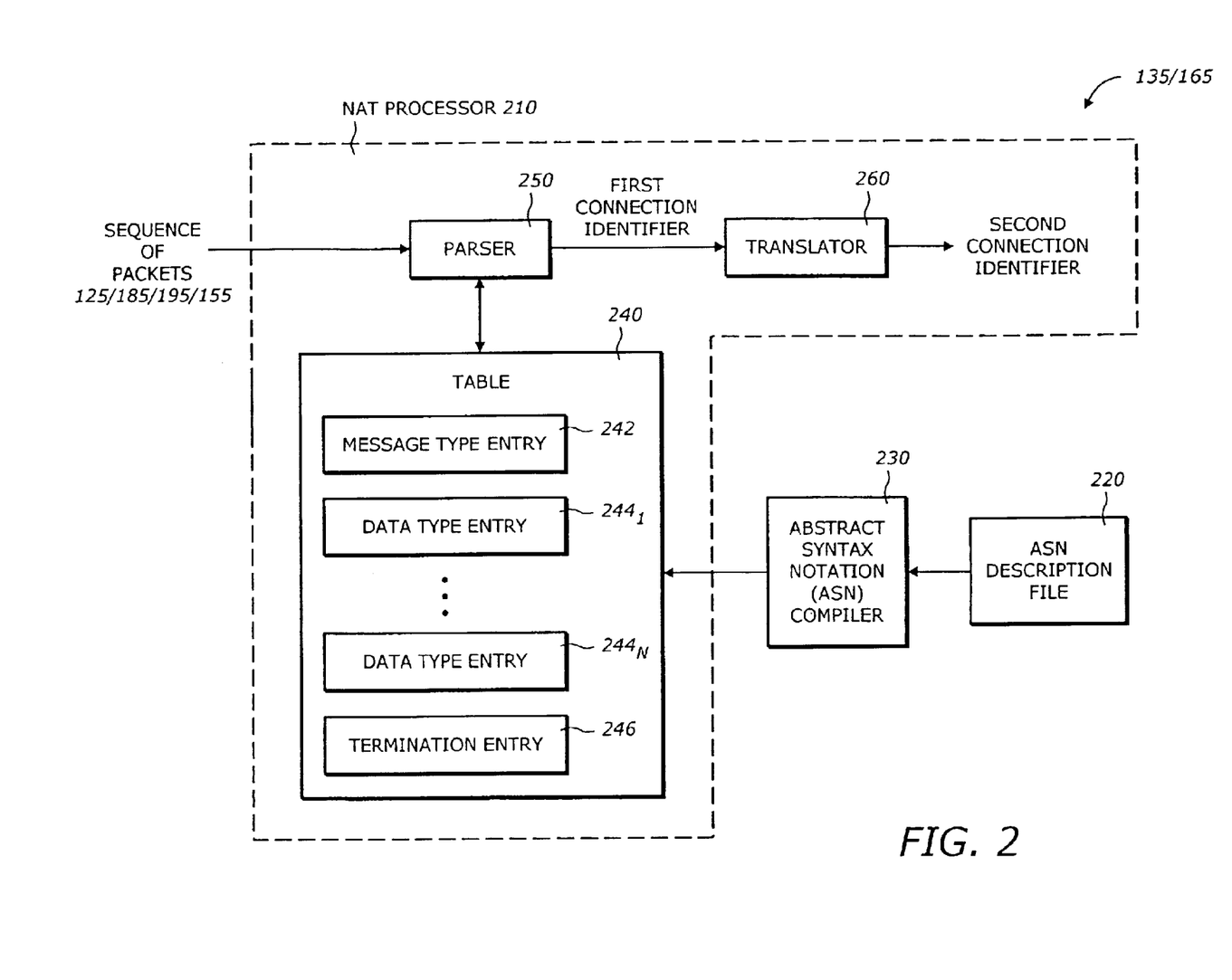
FIG. 2 is a diagram illustrating a network address translation (NAT) processing unit according to one embodiment of the invention.

FIG. 2 is a diagram illustrating a network address translation (NAT) processing unit 135/165 according to one embodiment of the invention. The NAT processing units 135 and 165 are essentially the same having similar functionalities. For simplicity, in the following only the reference to the NAT processing unit 135 is used. It is contemplated that the NAT processing unit 165 is similar. The NAT processing unit 135 includes a NAT processor 210, a message description file 220, and a description file compiler 230.

The NAT processor 210 receives the sequence of packets either from one of the end nodes (e.g., $120_1$ to $120_K$) or the public network 170 and translates the source connection identifiers embedded in the packets into corresponding connection identifiers for the destination. The NAT processor 210 includes a table 240, a parser 250 and a translator 260. The sequence of packets may be the sequence of packets 125, 155, 185, or 195. For simplicity, in the following, reference will be made to the sequence of packets 125. It is understood that other sequence of packets 155, 185, or 195 can be used.

The table 240 stores a plurality of entries for a packet in the sequence of packets 125 of a message transmitted from a source network to a destination network. When one of the end nodes $120_1$ to $120_K$ (or $150_1$ to $150_L$) sends the message to the public network 170, the source network is the private network 110 (or 140) and the destination network is the public network 170. Similarly, when the public network 170 sends the sequence of packets 185 (or the sequence of packets 195) to one of the end nodes $120_1$ to $120_K$ (or one of the end nodes $150_1$ to $150_L$), the source network is the public network 170 and the destination network is the private network 110 (or the private network 140).

The entries in the table 240 include a message type entry 242, N data type entries $244_1$ to $244_N$, and a termination entry 246. One of these entries includes a source connection identifier corresponding to the source network. The message type entry 242 specifies the type of the message (e.g., connect or disconnect messages). Each of the N data type entries $244_1$ to $244_N$ specifies the type of the data in the packets. By examining the type of the data, the parser 250 can determine what comes next in the data packets. Each of the N data type entries $244_1$ to $244_N$ may contain a descriptor of the data structure of the packet, such as a field length, a field value, or a pointer to another field. A field in the data type entry may correspond to a network address or a port. The termination entry 246 indicates that there is no more connection identifier in the subsequent packets. The termination entry 246 therefore allows the parser 250 to skip the subsequent packets because all network address or port information has been retrieved.

The parser 250 parses the sequence of packets 124 using the table 240. The parser 250 retrieves the entries from the table 240 and scans the received packets according to the entries. When a source connection identifier such as a network address or a port number is encountered, the parser 250 extracts the connection identifier and passes to the translator 260. The translator 260 converts or translates the source connection identifier into the destination connection identifier.

The entries in the table 240 are generated in advance by the description file compiler 230. The description file compiler 230 compiles the description file 220. The description file 220 describes the packets in the message according to a predetermined protocol and/or format. In one embodiment, the format of the description file 220 follows the Abstract Syntax Notation One (ASN.1). As is known by one skilled in the art, any appropriate format or standard can be used.

The table 240, the parser 250, and the translator 260 may be implemented by hardware, software, or a combination of both. When implemented by software, the table 240, the parser 250, and the translator 260 may be represented by modules in a program code. The coupling of these modules is represented by passing parameters, arguments, or pointers. The table 240 may be represented by a data structure.

Figure 3:
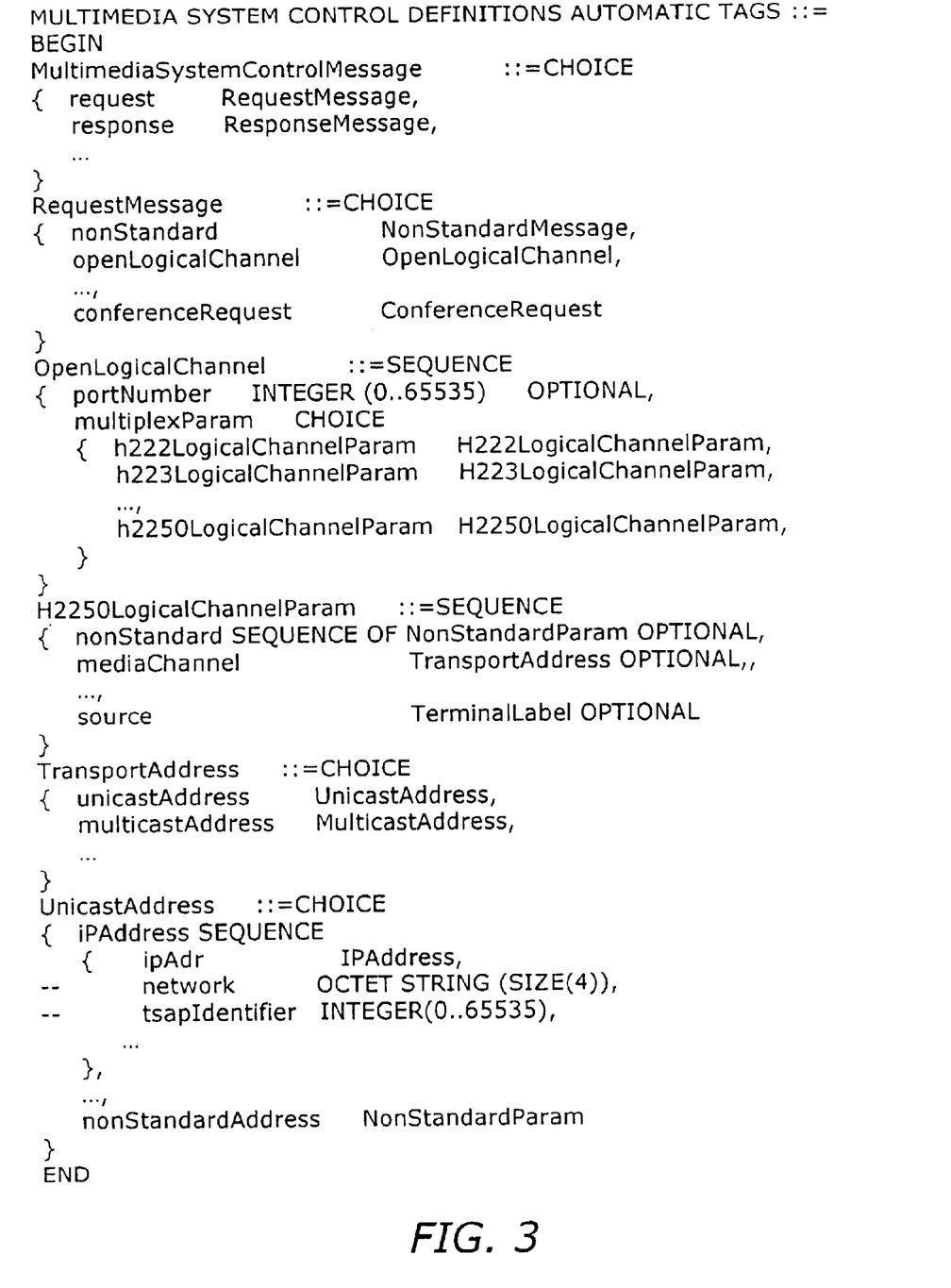
FIG. 3 is a diagram illustrating a description file according to one embodiment of the invention.

FIG. 3 is a diagram illustrating a description file according to one embodiment of the invention. For illustrative purposes, the description file is written in the Abstract Syntax Notation One (ASN.1). As is known by one skilled in the art, any other syntax or notation can be used.

The notation provides a certain number of pre-defined basic types such as: integers (INTEGER), booleans (BOOLEAN), character strings (IA5String, Universal String . . . ), bit strings (BIT STRING), etc., and makes it possible to define constructed types such as: structures (SEQUENCE), lists (SEQUENCE OF), choice between types (CHOICE), etc.

Figure 4:
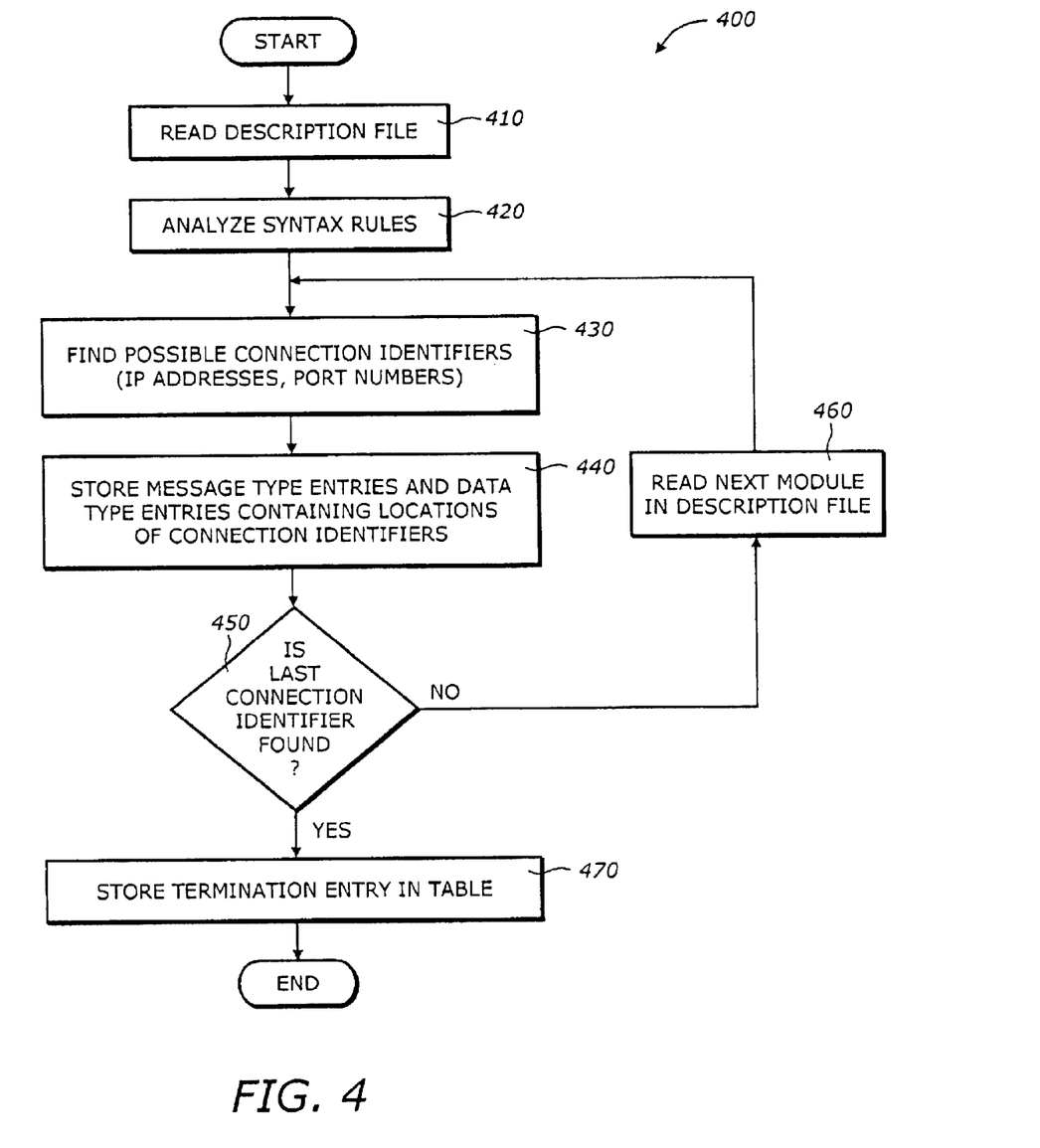
FIG. 4 is a flowchart illustrating a process to compile the description file according to one embodiment of the invention.

FIG. 4 is a flowchart illustrating a process 400 to compile the description file according to one embodiment of the invention.

Upon START, the process 400 reads the description file of the packets (Block 410). Then, the process 400 analyzes the syntax rules of the format or standard for the description file (Block 420). Next, the process 400 finds all the possible connection identifiers (e.g., network addresses, port numbers) embedded in the packets (Block 430). Then, the process 400 stores the entries including the message type entries and the data type entries containing the locations of the connection identifiers in the syntax table (Block 440).

Then, the process 400 determines if the last connection identifier for the sequence of packets is found (Block 450). If so, the process 400 stores a termination entry in the table indicating that no more addresses or port numbers are contained in the subsequent packets (Block 470) and is then terminated. Otherwise, the process 400 reads the next module in the description file (Block 460) and returns to Block 430 to continue processing.

Figure 5:
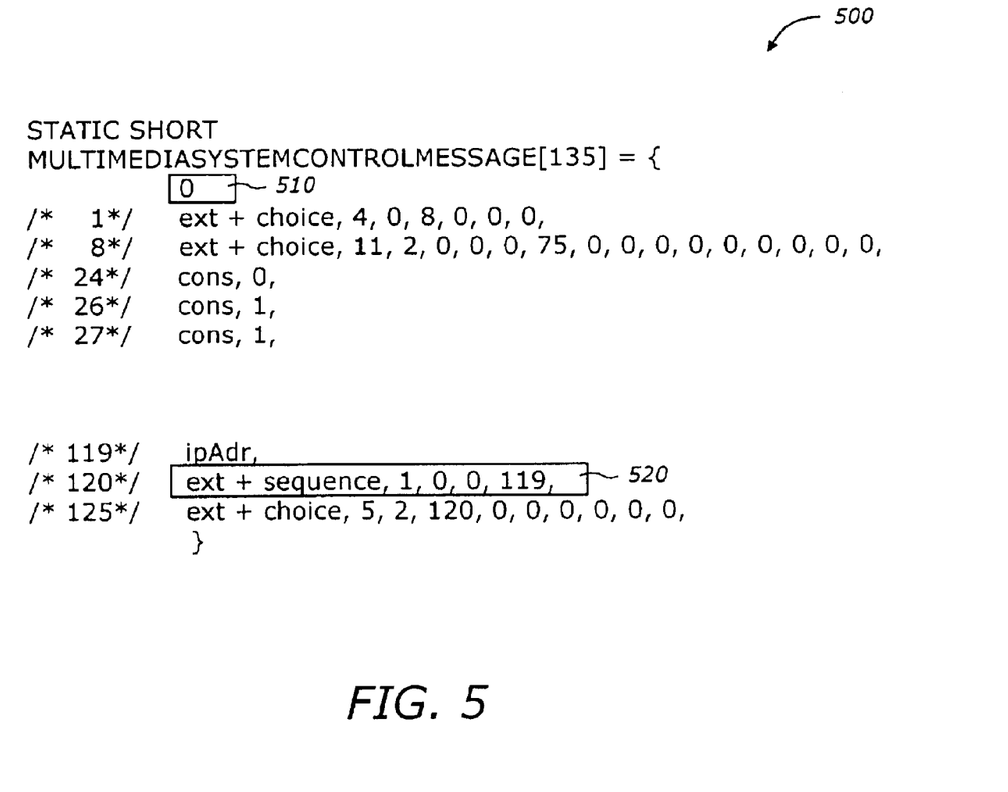
FIG. 5 is a diagram illustrating a data structure for a syntax table according to one embodiment of the invention.

FIG. 5 is a diagram illustrating a data structure 500 for a syntax table according to one embodiment of the invention.

In this illustrative example, the data structure 500 is an array of integer numbers. The numbers correspond to the entries. For example, the entry 510 is the message type entry. Other entries are data type entries which may contain the source connection identifier such as the IP address. Entry 520 is the data type entry which indicates the source network address.

Figure 6:
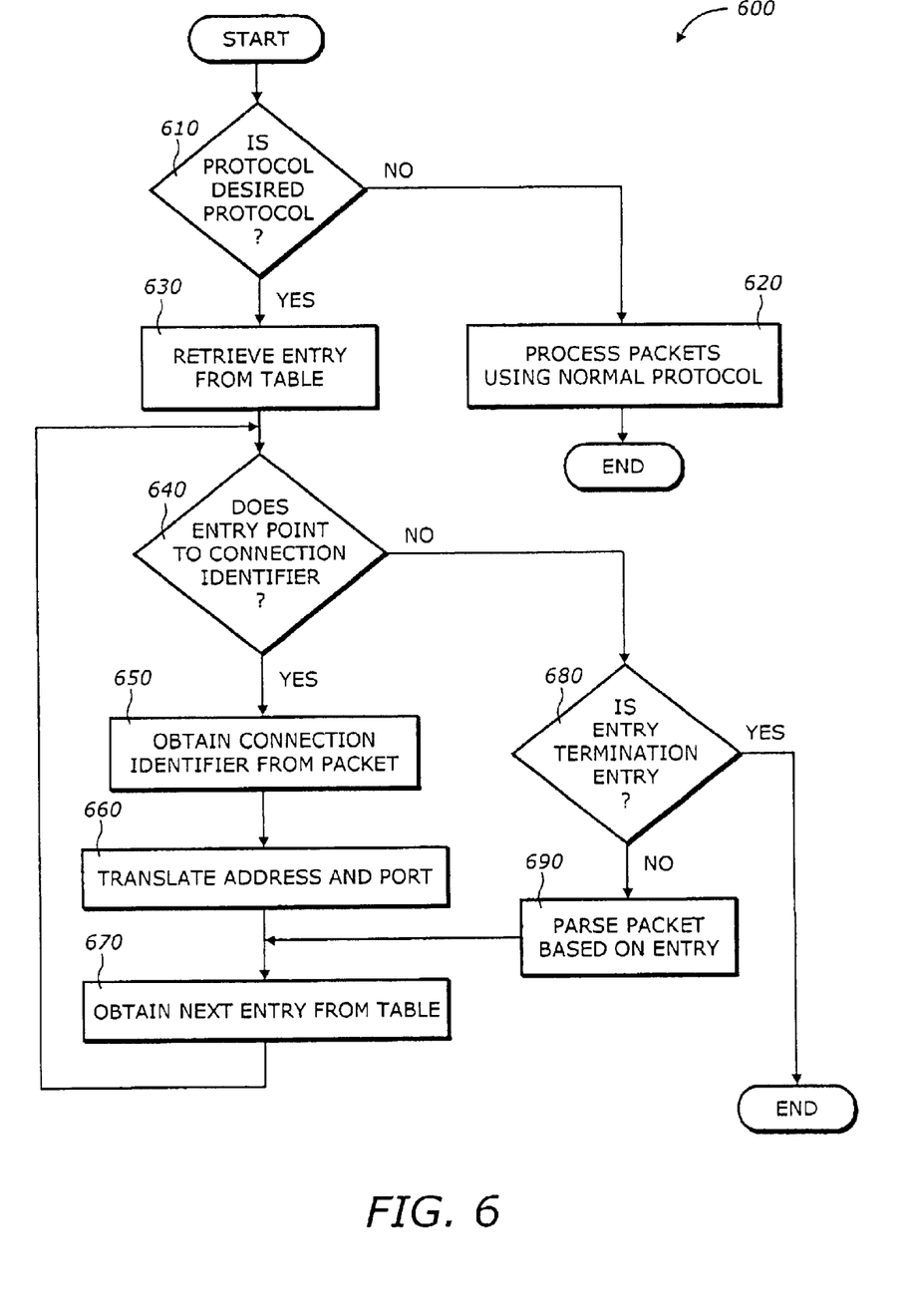
FIG. 6 is a flowchart illustrating a process to perform network address translation using the syntax table according to one embodiment of the invention.

FIG. 6 is a flowchart illustrating a process 600 to perform network address translation using the syntax table according to one embodiment of the invention.

Upon START, the process 600 determines if the protocol for the connection is the desired protocol (Block 610). If not, the process 600 processes the packets using the normal protocol (Block 620) and is then terminated. Otherwise, the process 600 retrieves an entry from the table (Block 630). Next, the process 600 determines if the entry contains or points to a connection identifier (Block 640). If not, the process 600 goes to Block 680. Otherwise, the process 600 obtains the connection identifier from the packet (Block 650). Next, the process 600 translates the source network address and/or the source port number into the destination network address and/or the destination port number (Block 660). Then, the process 600 obtains the next entry in the table (Block 670). Next, the process 600 returns to Block 640.

In Block 680, the process 600 determines if the entry is a termination entry. If so, the process 600 is terminated. Otherwise, the process 600 parses the packet based on the entry (Block 690) and then goes to block 670 to continue retrieving entries from the table.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a table to store a plurality of entries for a packet in a sequence of packets of a message transmitted from a first network to a second network, the entries including a first connection identifier corresponding to the first network and a termination entry indicating that subsequent packets do not contain the first connection identifier, the entries being obtained from a description file of the packet; and
    a parser coupled to the table to parse the sequence of packets using the table, the parser extracting the first connection identifier and skipping the subsequent packets upon reaching the termination entry.

2. The apparatus of claim 1 further comprises:
    a translator coupled to the parser to translate the first connection identifier into a second connection identifier corresponding to the second network.

3. The apparatus of claim 2 wherein the table comprises:
at least a message type entry to specify a message type characterizing the message; and
at least a data type entry to specify a data type of a subsequent packet in the sequence of packets.

4. The apparatus of claim 3 wherein the at least data type entry indicates a location of the first connection identifier in the subsequent packet.

5. The apparatus of claim 3 where the at least data type entry comprises the termination entry.

6. The apparatus of claim 1 wherein the first connection identifier is one of an address and a port identifier.

7. The apparatus of claim 2 wherein the second connection identifier is one of an address and a port identifier.

8. The apparatus of claim 1 wherein the first network is one of a private network and a public network.

9. The apparatus of claim 1 wherein the second network is one of a private network and a public network.

10. The apparatus of claim 1 wherein the description file is an abstract syntax notation (ASN) file.

11. The apparatus of claim 10 wherein the table is generated by an ASN compiler.

12. A method comprising:
storing in a table a plurality of entries for a packet in a sequence of packets of a message transmitted from a first network to a second network, the entries including a first connection identifier corresponding to the first network and a termination entry indicating that subsequent packets do not contain the first connection identifier, the entries being obtained from a description file of the packet; and
parsing the sequence of packets using the table, the parsing comprising extracting the first connection identifier, and skipping the subsequent packets upon reaching the termination entry.

13. The method of claim 12 further comprises:
translating the first connection identifier into a second connection identifier corresponding to the second network.

14. The method of claim 13 wherein storing comprises:
specifying a message type characterizing the message by at least a message type entry; and
specifying a data type of a subsequent packet in the sequence of packets by at least a data type entry.

15. The method of claim 14 wherein the at least data type entry indicates a location of the first connection identifier in the subsequent packet.

16. The method of claim 14 wherein the at least data type entry comprises the termination entry to indicate that a remaining portion of the sequence of packets does not contain the first connection identifier.

17. The method of claim 12 wherein the first connection identifier is one of an address and a port identifier.

18. The method of claim 13 wherein the second connection identifier is one of an address and a port identifier.

19. The method of claim 12 wherein the first network is one of a private network and a public network.

20. The method of claim 12 wherein the second network is one of a private network and a public network.

21. The method of claim 12 wherein the description file is an abstract syntax notation (ASN) file.

22. The method of claim 21 wherein the table is generated by an ASN compiler.

23. A computer program product comprising:
a machine useable medium having computer program code embedded therein, the computer program product having:
computer readable program code to store in a table a plurality of entries for a packet in a sequence of packets of a message transmitted from a first network to a second network, the entries including a first connection identifier corresponding to the first network and a termination entry indicating that subsequent packets do not contain the first connection identifier, the entries being obtained from a description file of the packet; and
computer readable program code to parse the sequence of packets using the table, the parser extracting the first connection identifier and skipping the subsequent packets upon reaching the termination entry.

24. The computer program product of claim 23 further comprises:
computer readable program code to translate the first connection identifier into a second connection identifier corresponding to the second network.

25. The computer program product of claim 24 wherein the computer readable program code to store comprises:
computer readable program code to specify a message type characterizing the message by at least a message type entry; and
computer readable program code to specify a data type of a subsequent packet in the sequence of packets by at least a data type entry.

26. The computer program product of claim 25 wherein the at least data type entry indicates a location of the first connection identifier in the subsequent packet.

27. The computer program product of claim 25 wherein the at least data type entry comprises the termination entry.

28. A system comprising:
an end node in a first network to communicate a message to a second network; and
a router coupled to the end node to route the message, the router including a network address translation (NAT) processor, the NAT processor comprising:
a table to store a plurality of entries for a packet in a sequence of packets of the message, the entries including a first connection identifier and a termination entry indicating that subsequent packets do not contain the first connection identifier, corresponding to the fast network, the entries being obtained from a description file of the packet, and
a parser coupled to the table to parse the sequence of packets using the table, the parser extracting the first connection identifier and skipping the subsequent packets upon reaching the termination entry.

29. The system of claim 28 wherein the NAT processor filer comprises:
a translator coupled to the parser to translate the first connection identifier into a second connection identifier corresponding to the second network.

30. The system of claim 29 wherein the table comprises:
at least a message type entry to specify a message type characterizing the message; and
at least a data type entry to specify a data type of a subsequent packet in the sequence of packets.

31. The system of claim 30 wherein the at least data type entry indicates a location of the first connection identifier in the subsequent packet.

32. The system of claim 30 wherein the at least data type entry comprises the termination entry.

* * * * *